Patented May 24, 1932

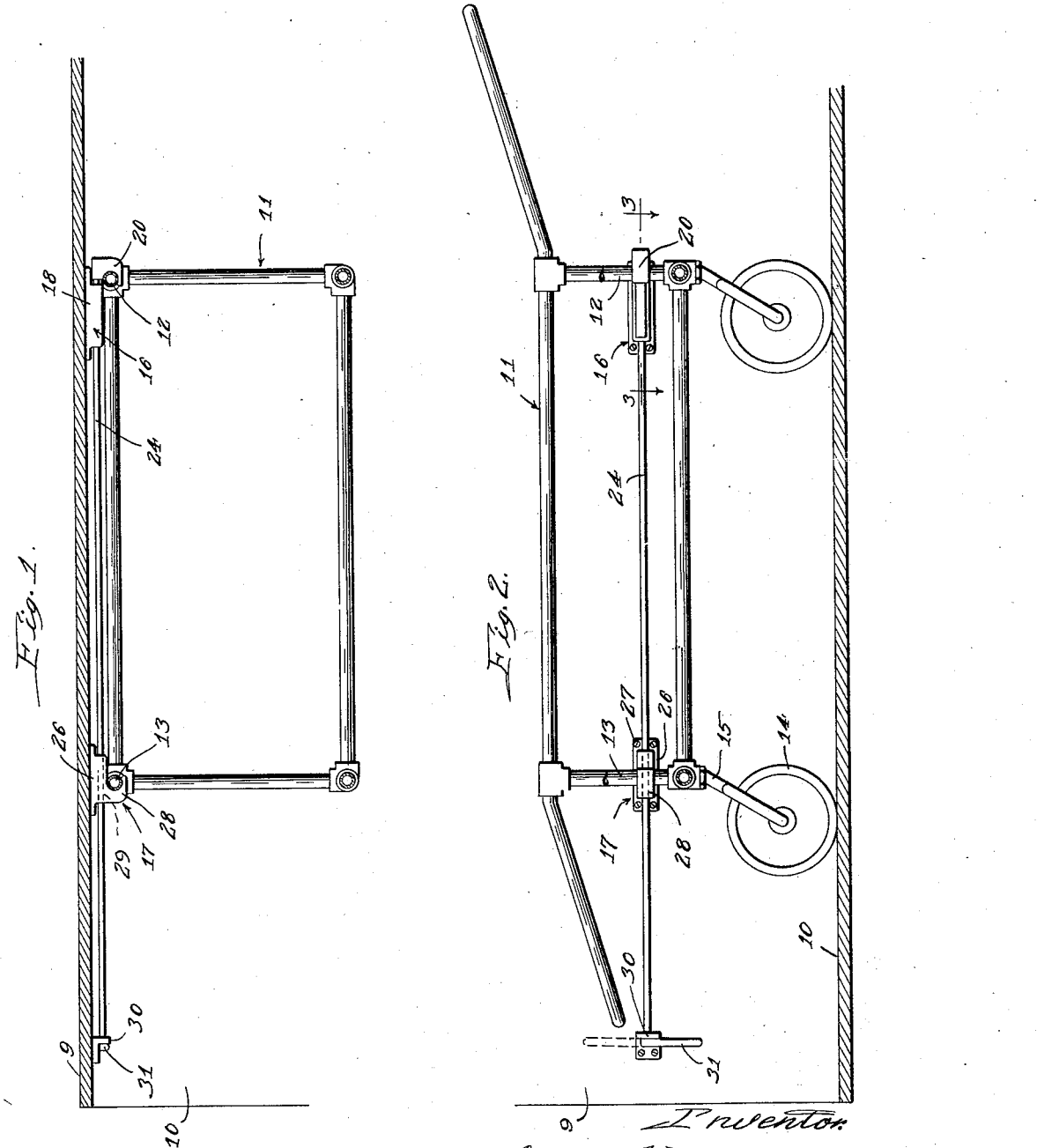

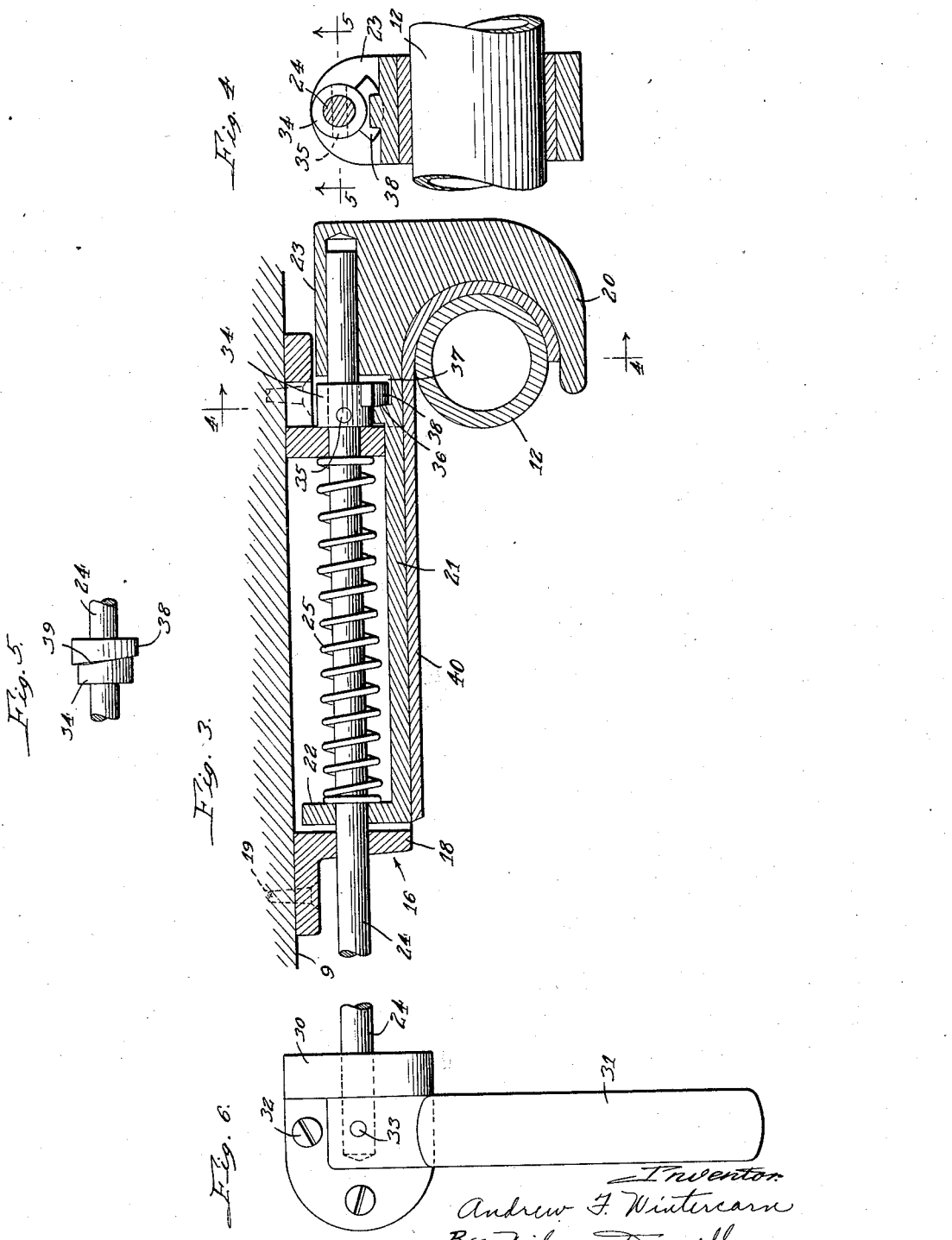

1,859,484

UNITED STATES PATENT OFFICE

ANDREW F. WINTERCORN, OF ROCKFORD, ILLINOIS, ASSIGNOR TO HENNEY MOTOR COMPANY, OF FREEPORT, ILLINOIS, A CORPORATION OF DELAWARE

COT FASTENER FOR AMBULANCES

Application filed March 31, 1931. Serial No. 526,713.

This invention relates to cot fasteners for use in ambulances and other vehicles.

Cot fasteners have been available in various forms but have been subject to one or more serious objections. In some cases the fasteners were apt to allow movement of the cot, especially if the vehicle were to suddenly slow down or make a sharp turn, and with certain constructions such movement was apt to cause unfastening of the cot. Then, too, there has been the objection with most cot fasteners that the fastening and unfastening of the cot is not as handy as desired and takes up too much time. It is, therefore, the principal object of my invention to provide cot fasteners which not only positively lock the cot in position but are so arranged and constructed that the fastening and unfastening of the cot can be attended to easily from a remote point, as for example, from the rear door of an ambulance.

The invention is illustrated in the accompanying drawings, wherein—

Figure 1 is a plan view showing cot fasteners made in accordance with my invention in a typical ambulance installation;

Fig. 2 is a side view;

Fig. 3 is a horizontal section of the front fastener taken on the line 3—3 of Fig. 2 on an enlarged scale;

Fig. 4 is a cross-section on the line 4—4 of Fig. 3;

Fig. 5 is a sectional detail on the line 5—5 of Fig. 4, and

Fig. 6 is a front view of the operating handle.

The same reference numerals are applied to corresponding parts throughout the views.

The numerals 9 and 10 indicate the side wall and floor, respectively, of the ambulance or other vehicle in which the cot shown at 11 is to be fastened in place. The cot may be of any suitable or preferred construction, that shown being of the conventional form providing front and rear legs 12 and 13, respectively, by means of which the same may be conveniently fastened to the side wall 9. As usual, wheels 14 are provided on the cot to permit it to be rolled into and out of position on the floor 10 in the ambulance. The wheels are preferably mounted as at 15 so as to caster and thus permit sidewise movement at will. Two fasteners are provided, a front fastener 16 and a rear fastener 17 arranged to cooperate with the legs 12 and 13, respectively, to fasten the cot to the side wall 9.

The front fastener 16 comprises a housing 18 suitably fastened by its base portion, as at 19, to the side wall to serve as a guide for the front hook 20. The latter is rearwardly facing and has an elongated shank portion 21 slidably mounted for fore and aft movement in the housing 18 by means of lugs 22 and 23 at opposite ends of the shank which are slidably mounted on a rod 24 extending lengthwise through the housing from the rear thereof and held against endwise movement with respect thereto in a manner that will soon appear. A coiled compression spring 25 fits about the rod 24 in the housing between the lug 22 and the opposite end of the housing, and tends normally to urge the hook 20 rearwardly, whereby to securely hold on to the front leg 12 of the cot. The spring 25 is, however, arranged to yield to permit forward movement of the hook with the leg 12 when the cot is being maneuvered into position for fastening, as will soon appear.

The rear fastener 17 comprises a cast body 26 suitably secured at at 27, to the side wall and formed to provide a rigid forwardly facing hook 28 for reception therein of the rear leg 13 of the cot. The cot as it is rolled into position in the ambulance for fastening has the front leg 12 engaged with the hook 20 and then the cot is moved forwardly against the resistance of the spring 25 far enough to allow the rear leg 13 to be engaged on the hook 28 by moving the cot sidewise. There is obviously no difficulty whatever in fastening or unfastening the cot. The cot is held pretty firmly by engagement of the hooks 20 and 28 with the front and rear legs 12 and 13, respectively, but sudden stopping or slowing down of the ambulance would result in the cot rolling forward more or less under its momentum as permitted by yielding of the spring 25. The rear leg 13 in that event would be apt to become disengaged from the hook 28, and the cot would then be free to roll about in the ambulance. It will be evident that when the ambulance suddenly slows down and turns a corner there is also a tendency for the cot to move sidewise away from the wall, and this, coupled with the movement forwardly of the cot under its momentum, would increase the danger of the cot becoming unfastened under those conditions. According to my invention, I provide a positive but quickly releasable lock for holding the front hook 20 in closed position and preventing movement thereof by the cot.

According to my invention, the rod 24, constituting a guide for the front hook 20 and its actuating spring 25, extends rearwardly from the housing 18 of the hook 20 through a bearing 29 provided in the body 26 of the rear hook 28, and beyond the latter to the foot end of the cot where it passes through a hole in a bracket 30 and has a handle 31 fixed on the end thereof. The bracket 30 is arranged to be fastened suitably by screws 32 to the side wall, and a pin 33 can be provided for fastening the handle to the end of the rod. The rod 24 has a collar 34 suitably secured thereto as by means of a pin 35, and this collar has abutment with the front end of the housing 18 so that the rod is held against endwise movement by the handle at one end and the collar at the other. A shoulder 36 is formed at one end of a recess 37 provided on the shank 21 of the hook 20 behind the lug 23, and a key 38 projecting from the collar 34 is arranged to enter the recess 37 when the collar 34 is turned by means of the rod 24. The rear face 39 of the key 38 is formed cam-shaped, as appears in Fig. 5, so that as the rod 24 is turned in a clockwise direction as viewed in Fig. 4, the key 38 forces the hook 20 rearwardly as the cam face 39 of the key has wedging engagement with the shoulder 36.

In operation, the handle 31 is swung upwardly to the dotted line position shown in Fig. 2 so as to give the rod 24 a half turn and withdraw the key 38 from the recess 37 and thereby unlock the hook 20. The hook 20 is then free to move forwardly against the action of the spring 25 in the fastening or unfastening of the cot. Assuming that a cot has just been fastened in place by engagement of the front and rear legs 12 and 13 with the hooks 20 and 28, respectively, in the manner previously described, the handle 31 will then be swung down to the full line position shown in Fig. 2 so as to lock the hook 20 by means of the key 38. The hooks are both suitably lined with felt or other cushioning material, as indicated at 40, so as to prevent marring the legs of the cot by the fastening thereof in the manner herein contemplated. This cushioning material affords enough "give" so that the handle 31 can be swung all the way down as the key 38 forces the hook 20 rearwardly under the cam action of its face 39. The cot is, therefore, firmly held in place between the two hooks and cannot possibly rattle. The fact that the front hook is positively held against movement obviously prevents the cot from becoming unfastened regardless of the sudden stopping or slowing down of the ambulance or the turning of corners. It takes very little effort to turn the handle from one position to the other, and since the handle is swung upwardly for unlocking of the hook 20, it is obvious that if the operator should happen to forget to swing it down to lock the hook, the handle would be more or less certain of dropping by gravity in the motion of the ambulance and thus lock the hook automatically, even though the handle were not moved to its lower limit.

I claim:

1. Fastening means for a cot or the like comprising a pair of spaced bases suitably supported adjacent the front and rear portions of a cot to be fastened, a hook projecting rigidly from the one base and facing in one direction to hold one portion of the cot, a companion hook projecting from the other base and facing in the opposite direction to hold the other portion of the cot, means for slidably mounting the last mentioned hook on its base for movement toward and away from the first hook, spring means on said base normally urging the slidable hook to move relative to the base in one direction to hold the cot portion thereon, the cot being arranged to be engaged on the hooks by engagement of the one portion first with the slidable hook to permit movement of said hook against the action of its spring means by manual movement of the cot so as to permit engagement of the other cot portion with the stationary hook, a rod extending from the slidable hook to an operating point, said rod being rotatable with respect to the base of said hook but held against endwise movement with respect thereto, a key turned with the rod from an out-of-the-way position to an operative position in which the same locks the slidable hook against movement by the cot, and a handle on said rod at the operating point for turning the same.

2. Fastening means for a cot or the like comprising a pair of spaced bases suitably supported adjacent the front and rear portions of a cot to be fastened, a hook on the rear base projecting rigidly therefrom and facing in one direction to hold the rear portion of the cot, a companion hook slidable on the front base toward and away from the first hook and facing in the opposite direction to hold the front portion of the cot, spring means on said base normally urging the slidable hook to move relative to the base in one direction to hold the cot portion thereon, the cot being arranged to be engaged on the hooks by engagement of the front portion first with the slidable hook to permit movement of said hook against the action of its spring means by manual movement of the cot so as to permit engagement of the rear cot portion with the stationary hook, a rod extending from the front hook rearwardly past the rear hook to an operating point, said rod being rotatably mounted on the two bases but held against endwise movement with respect thereto, a key on the front end of said rod turned with the rod from an out-of-the-way position to an operative position in which the same locks the slidable hook against movement by the cot, and a handle on the rear end of said rod at the operating point for turning the same.

3. Fastening means as set forth in claim 1 wherein the key has a cam surface provided thereon for wedging engagement with a surface on the slidable hook, whereby to move the hook positively toward cot holding position by turning of the rod.

4. Fastening means for a cot or the like comprising a pair of spaced bases arranged to be suitably supported adjacent the front and rear portions of a cot to be fastened, a hook projecting rigidly from the one base and facing in one direction to hold one portion of the cot, a companion hook projecting from the other base and facing in the opposite direction to hold the other portion of the cot, means for slidably mounting the last mentioned hook on its base for movement toward and away from the first hook, spring means on said base normally urging the slidable hook to move relative to the base in one direction to hold the cot portion thereon, the cot being arranged to be engaged on the hooks by engagement of the one portion, first, with the slidable hook to permit movement of said hook against the action of its spring means by manual movement of the cot so as to permit engagement of the other cot portion with the stationary hook, and a member rotatable relative to one of said bases and the hook thereon from an inoperative position toward a position locking the cot in place between the hooks.

In witness of the foregoing I affix my signature.

ANDREW F. WINTERCORN.